(12) United States Patent
Bar-on (10) Patent No.: US 11,470,031 B2
(45) Date of Patent: Oct. 11, 2022

(54) ELECTRONIC MAIL FORMAT PROTOCOL FOR INSTRUCTING AUTOMATIC BEHAVIOR OF ELECTRONIC DEVICES EXECUTING AN ELECTRONIC MAIL CLIENT APPLICATION

(71) Applicants: Atlassian Pty Ltd., Sydney (AU); Atlassian Inc., San Francisco, CA (US)

(72) Inventor: Noam Bar-on, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 4 days.

(21) Appl. No.: 16/717,208

(22) Filed: Dec. 17, 2019

(65) Prior Publication Data
US 2021/0099411 A1    Apr. 1, 2021

Related U.S. Application Data

(60) Provisional application No. 62/907,702, filed on Sep. 29, 2019.

(51) Int. Cl.
*H04L 51/18*  (2022.01)
*H04L 51/42*  (2022.01)
*H04L 51/222*  (2022.01)
*H04L 51/58*  (2022.01)

(52) U.S. Cl.
CPC ............ *H04L 51/222* (2022.05); *H04L 51/18* (2013.01); *H04L 51/42* (2022.05); *H04L 51/58* (2022.05)

(58) Field of Classification Search
CPC ......... H04L 51/20; H04L 51/18; H04L 51/22; H04L 51/38
See application file for complete search history.

(56) References Cited

U.S. PATENT DOCUMENTS

| | | | |
|---|---|---|---|
| 10,965,628 B2 * | 3/2021 | Gupta | H04L 51/063 |
| 2006/0136985 A1 * | 6/2006 | Ashley | H04L 63/0407 726/1 |
| 2009/0248806 A1 * | 10/2009 | Teman | H04L 51/34 709/206 |
| 2014/0136640 A1 * | 5/2014 | Shih | G06Q 10/10 709/206 |
| 2014/0253568 A1 * | 9/2014 | Mahajan | G06T 1/20 345/522 |
| 2016/0360336 A1 * | 12/2016 | Gross | H04M 1/72403 |

\* cited by examiner

*Primary Examiner* — Sm A Rahman
(74) *Attorney, Agent, or Firm* — Brownstein Hyatt Farber Schreck, LLP (57) ABSTRACT

An electronic mail system such as described herein in which an email message includes an embedded payload that comprises instructions and/or action items to inform one or more behaviors of an electronic mail client application and/or one or more hardware functions or sensors of the electronic device executing the electronic mail client application.

14 Claims, 8 Drawing Sheets

FIG. 5

ELECTRONIC MAIL FORMAT PROTOCOL FOR INSTRUCTING AUTOMATIC BEHAVIOR OF ELECTRONIC DEVICES EXECUTING AN ELECTRONIC MAIL CLIENT APPLICATION

CROSS-REFERENCE TO RELATED APPLICATION

This application is a nonprovisional patent application of and claims the benefit under 35 U.S.C. 119(e) of U.S. Provisional Patent Application No. 62/907,702, filed Sep. 29, 2019 and titled "Electronic Mail Format Protocol for Instructing Automatic Behavior of Electronic Devices Executing an Electronic Mail Client Application," the disclosure of which is hereby incorporated herein by reference in its entirety.

TECHNICAL FIELD

Embodiments described herein relate to electronic mail and, in particular, to systems and methods for defining and utilizing a defined protocol for embedding information as a payload into an electronic mail message and to systems and methods for processing a payload conforming to the protocol with an electronic mail client application executing on an end-user electronic device to perform one or more device-level actions.

BACKGROUND

Electronic mail can be useful to convey information to end users of a software service. For example, an end user of a software service may benefit to receive one or more electronic mail messages providing updated information related to the software service and relevant to the end user. Using electronic mail in this manner has many benefits to both an entity administering a software service and to an end user of that software service. For example, the entity can avoid expenses associated with developing and/or maintaining a dedicated native application to provide information to the end user and the end user can view and act upon electronic mail messages from multiple sources through a convenient single interface, namely, an electronic mail message client application.

However, an end user may receive a large quantity of electronic mail messages from certain software services. In such cases, the user is left to sort, filter, and/or otherwise triage electronic mail messages and to manually determine which messages or content should be consumed and/or acted upon first, often resulting in inefficiencies and, in some cases, delayed responses to time-sensitive notifications or content inadvertently overlooked by the end user. Further, conventional electronic mail message client applications are often unable to assist users with triaging electronic messages due to sandboxing requirements and/or other system-level application programming interface or permissions limitations.

SUMMARY

Embodiments described relate to an electronic mail client device, also referred to as an "end-user device" or a "client device" that is configured to communicably couple to an electronic mail host server. The electronic mail client device includes a display configured to render a graphical user interface, a memory storing computer program instructions, and a processor. The processor is configured access the memory and to execute the computer program instructions to instantiate an electronic mail client application.

The electronic mail client application is configured to perform the operations of: generating and submitting a request the electronic mail host server; receiving from the electronic mail host server, in response to the request; a message file with a predetermined embed tag; extracting from the message file string content enclosed by the custom embed tag; instantiating a data object based on the string content; and displaying content of the message file (or a portion thereof) in a notification generated by the electronic mail client application only upon determining that the data object includes an instruction to the electronic mail client application to display the message file.

Embodiments described herein relate to methods of processing a received electronic mail message. In one example, a method includes the operations of: receiving the electronic mail message at a client device executing an electronic mail message client application with a graphical user interface; extracting from content of the electronic mail message a string value identified by a predetermined embed tag; preventing display of the electronic mail message in a message list of the graphical user interface based on the string value; and generating a notification by the client device; at least one of a format characteristic or a content item of the notification based on the string value.

Embodiments described herein relate also to methods of processing a received electronic mail message. In one example, a method includes the operations of: receiving the electronic mail message at a client device executing an electronic mail message client application with a graphical user interface; extracting from content of the electronic mail message a string value identified by a predetermined embed tag; querying a status of a sensor of the client device, the sensor selected from a set of sensors based, at least in part, on the extracted content of the electronic mail message; and ordering a message list of the graphical user interface based on the status of the sensor.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to electronic mail message, and, in particular, to systems and methods for embedding information and/or instructions into an electronic mail message, the embedded information and/or instructions encoded according to a predetermined protocol. In these embodiments, an end-user electronic device (also referred to herein as a "client device") can execute a electronic mail message client application, configured as described herein, that extracts the embedded information and/or instructions (also referred to herein as a "payload") and can cause the client device to perform one or more system-level and application-level functions (in sequence or in parallel, substantially simultaneously), automatically, and according to one or more instructions defined in the payload.

As a result of these constructions, a sender of an electronic mail message can inform and/or otherwise dictate (1) how that electronic mail message is consumed by a target end-user, (2) how that electronic mail message is consumed and/or processed by an end-user's electronic device, and/or (3) what function or functions a recipient electronic device can or should perform in response to receiving a message from that sender.

Example ways by which the manner an end-user consumes an electronic mail message received by an electronic mail message client application, such as described herein, can include, but are not limited to: suppressing display of an electronic mail message from an electronic mail message list (also referred to as an "inbox"); displaying an electronic mail message in a different manner than other electronic mail messages; displaying content of an electronic mail message in a different user interface location, separate from the user's inbox (e.g., a tab or location dedicated to different message types, such as social media messages, software service notifications, shopping messages, and the like); and the like.

Example functions that can be performed by an electronic mail message client application in response to receiving an electronic mail message including a payload such as described herein include, but are not limited to: suppressing display of an electronic mail message from an inbox and, instead, generating a native application notification formatted according to a payload extracted from the mail message; suppressing display of an electronic mail message from an inbox and, instead, generating a native application notification with content defined by, or extracted from, a payload extracted from the mail message; displaying a received electronic mail message according to, or otherwise informed by, a format definition extracted from a payload extracted from the electronic mail message; displaying an already-received electronic mail message or a set of already-received electronic mail messages, according to, or otherwise informed by, a format definition extracted from a payload extracted from a newly-received electronic mail message; and the like.

Example functions that can be performed by an end-user client device, such as described herein, in response to an electronic mail message client application executed by that end user client device receiving an electronic mail message including a payload such as described herein include, but are not limited to: accessing a sensor (e.g., a gyroscope, an accelerometer, a global positioning system sensor, a battery level sensor, a camera or image sensor, a light sensor, an acoustic sensor, or an environmental sensor such as a temperature sensor, humidity sensor, hygrometer, barometer, air quality sensor, and so on) of the client device and obtaining a state or status of the sensor; performing an action with a haptic output element of the client device; performing a disk-level action (e.g., add a file, delete a file, move a file, and so on) outside of the context or sandbox of the electronic mail message client application; and so on.

In further examples, multiple functions can be performed by the end-user client device in a workflow, program, or other order or sequence to confer additional benefits to the end-user beyond the convenience of simply receiving and consuming an electronic mail message. For example, an end-user client device can determine its location in response to receiving an email (e.g., via a Bluetooth component, a Wi-Fi component, a global position system sensor, and so on). In these examples, the device's location can be used to inform how one or more electronic mail messages are displayed, how the end user is notified that a new electronic mail message has been received, or any other suitable action. For example, in these embodiments, if an end user receives a high priority electronic mail message when that user is physically within a machine shop (where that user is unlikely to hear an acoustic notification or to feel a haptic notification), the end-user electronic device can be instructed by the electronic mail message itself to send a signal to an industrial control system in the machine shop to flash the lights of the machine shop, to flash a warning light, or initiate an announcement via an intercom system. Continuing the example, of the same end-user receives the same message while the end-user is not in the machine shop, the message may be delivered and the user may be notified in a conventional manner. A person of skill in the art may readily appreciate that by leveraging the methods and systems described herein, safety and promptness of drawing a recipients attention to a message can be dramatically improved.

In yet another example, an end-user device can be configured to leverage more than location data. For example, the device may be configured to automatically connect to a conference room's multimedia system upon receiving an invitation to a meeting in that conference room when the device is physically present within that conference room. In another example, and end-user device can be configured to determine whether the end-user is currently driving a vehicle and/or is using navigation software; for example, to determine whether the user is on his or her way to a meeting. In this example, a meeting cancellation message sent to the user may inform the end-user electronic device to interrupt navigation and to inform the user that the meeting to which the user is driving has been canceled and/or relocated to a different location. In the second case, the end-user device can be configured to automatically adjust the destination address based on content of the message received.

In yet other examples, one or more functions of an end-user electronic device can be delayed or enqueued until a sensor of the end-user electronic device transitions to a particular desired state. For example, an electronic mail message related to a task the recipient of that message has to perform in a particular location (e.g., a trouble ticket to fix a particular piece of office equipment) can be sorted to the top of a message list when the end user is nearby that particular location. In one specific example, an information technology specialist may receive a number of messages on a daily basis each related to or associated with trouble tickets that require the user's physical presence in different locations. In these examples, each message can encode location information or geo-fence information such that when the specialist is on the 13$^{th}$ floor of a particular office building, messages (or trouble tickets) related to that floor—regardless of when such messages were sent or received—can be sorted to the top of the specialist's message list so that when the specialist checks his or her electronic mail messages, location-relevant messages are prominently displayed. In a further example, a retail store may send an electronic mail message to a customer. If the customer receives the message while the customer is physically within a retail location of the retail store, a coupon may be issued to the customer by the retail store. In another example, the retail location may issue a coupon to the customer if the customer visits the retail store within a time period of receiving the message (e.g., if the customer visits a retail location of the retail store within three days of receiving the message, a coupon can be issued to the customer).

In yet other examples, other sensors or systems of an electronic device that receives an electronic mail message can be used. For example, internet requests for information can be initiated in response to receiving an email. As one example, if an end-user receives a message that is a receipt for a purchase, an request can be initiated to the credit card issuer such that the user's credit card balance may be shown.

The foregoing examples are not exhaustive; other systems or combinations of requests can be triggered and/or otherwise leveraged in response to receiving an electronic mail message, such as described herein.

For simplicity of description and brevity, the term "email" can be used herein to refer to an electronic mail message. An email is typically a file formatted according to, and/or otherwise compliant with, one or more protocols and is sent via the open Internet from a sender to a recipient. More specifically, an email, such as described herein originates at a sender server, also referred to herein as a "third-party server" that communicably couples with an "email host" server associated with an email provider, of which the recipient of the email is a subscriber. At a later time, a client device operated by the recipient (herein, "end user" or "recipient") communicably couples to the email host and receives a copy of the email sent from the sender, which may also include metadata information such as message-identifying information and/or server identifying information. Such information, along with other email metadata included in the email received at the client device is referred to as "header" information.

More specifically, the client device operated by an end-user may include a processor and a memory. The processor can be configured to execute program code and/or instructions stored in the memory to instantiate an instance of an electronic mail client application that, in turn, is configured to communicably couple to, and exchange information with, the email host server. In these examples, the electronic mail client application can receive and/or otherwise process email messages stored on the email host server. Once a "new" message is received by the electronic mail client application from the email host server, it may be referred to as the "received email message."

Once the electronic mail client application of the client device receives the received email message from the email host server, one or more processing services, functions, modules, or modes of operation of the electronic mail client application can be triggered. One or more of these processes can be configured to determine whether the received email message includes embedded information or, in another non-limiting phrasing, whether the received email message includes a payload such as described herein. In many embodiments, a payload such as described herein can be inserted into a body of the received email message and can be tagged or otherwise enclosed within custom tags, delimiters, or markup to signal to the electronic mail client application where the string value begins and where the string value ends. For example, in one embodiment, the received email message can have content formatted according to the HyperText Markup Language ("HTML") protocol. In this example, a payload such as described herein can be enclosed in tags/markup that is compliant with the HTML protocol. For example, the payload can be enclosed between "<script>" and "</script>" tags. In other cases, the payload can be enclosed between entirely custom tags, such as "<custom-payload-tag>" and "</custom-payload-tag>." These are merely examples, a person of skill in the art may appreciated that a string payload, such as described herein can be suitably identified and/or otherwise extracted from a body portion of an email in a number of suitable ways. Additional examples include, but are not limited to: a payload embedded between comment tags; a payload embedded in a script link; a payload embedded in a Cascading Style Sheet ("CSS") or link thereto; a payload embedded as an email header; a payload embedded as a data item within an existing or custom tag; and so on. For simplicity of description, the embodiments that follow reference a payload embedded between custom tags in an (at least partially) HTML-formatted email message body.

In many examples, a string value corresponding to a payload such as described herein conforms to a computer-readable and/or computer-parseable format, such as JavaScript Object Notation ("JSON) or Extensible Markup Language ("XML"). In other cases, the payload can be submitted as an attachment to an email message or embedded in an attachment to an email message. These examples are not exhaustive, however, and it may be appreciated that in other examples other computer-readable formats may be considered and/or may be appropriate. For simplicity of description, the embodiments that follow reference a JSON-formatted string value that corresponds to a payload, such as described herein.

In view of the foregoing definitions and examples, it may be appreciated that a sender of an email message can generate a payload (with one or more instruction and/or "action items"), format that payload as a JSON string, enclose that string between custom HTML tags, insert the enclosed embedded string into a body of an email. Thereafter, the sender to operate the third-party server to send the email to the email host server. The email host server can thereafter, optionally, notify the client device that a new email message is received and is ready for processing. At a later time (e.g., after receiving a notification from the email host server or), the electronic mail client application, executed by the client device, can receive the email message from the email host server and can extract the string value corresponding to the payload from the received email message by searching through the email body for the custom HTML tags. Thereafter, optionally, the electronic mail client application can parse or otherwise convert the string value into a data object.

Once the electronic mail client application has extracted the payload (and, optionally, converted a string value into a data object, or a set of data objects), the electronic mail client application can execute one or more instructions (also referred to herein as "action items") defined by the payload or, additionally or alternatively, the electronic mail client application can trigger one or more operations or tasks in response to content of the payload. In this manner, the payload defines one or more behaviors of the electronic mail client application.

For example, in one embodiment, an email can include a payload that includes an action item that causes the electronic mail client application to hide the email from an end-user's inbox. In this example, the payload can include a second action item that causes the electronic mail client application to generate a notification for the end user that may be shown immediately or at a specified time. In many cases, content of the notification can be extracted from the payload or another location of email body. In some examples, a format, style, or multimedia content of the notification (e.g., such as an image shown along with the notification, such as a corporate logo), can be defined by the payload. As a result of the constructions of this example, a sender of the email can define an end-user experience that is substantially different from a traditional email message. Namely, when the end-user receives a standard email message, it appears in an inbox of the client application alongside all other messages from other senders. In this example, the received email message is hidden from the end user and, instead, a notification is shown. In this manner, the end-user's inbox is uncluttered by the email message, but the user still receives important information that the sender desires to communicate.

In one specific example, the sender of an email message may be software service, such as a project tracking tool (also referred to as a "collaboration tool"). In these examples, as may be known by a person of skill in the art, the collaboration tool can be configured to generate email messages to notify users of the collaboration tool of information related to a project tracked by the tool. In conventional examples, as noted above, a conventional collaboration tool may generate and send dozens if not more messages per day directed to the same recipient. This quantity of email messages in an user's inbox may reduce the usefulness of the user's email by a substantial amount. Some further conventional email clients may be configured to allow for actions to be performed by a user from the email message itself (e.g., Gmail One-Click Actions, or Microsoft Outlook Voting or Meeting Responses), however, these conventional solutions either (1) only perform a single web request (e.g., Gmail One-Click Actions) that may cause a client device to switch applications or for an end user to switch focus to a new pop-up window or (2) only perform an action that triggers an email to be sent from the end-user's account. In many cases, a user may not prefer to have unsolicited email sent on the user's behalf (e.g., Outlook) and/or the user may not prefer to have focus diverted in order to take action upon a task identified in an email message (e.g., Gmail).

As such, continuing the example above, for embodiments described herein a collaboration tool can be configured to embed a payload with multiple action items such as described herein to simplify how the end-user consumes email messages from that collaboration tool. More specifically, a collaboration tool can be configured to, without limitation, embed a payload to: hide all messages generated by the collaboration tool, instead causing the electronic mail client application to render a popup at a particular time of day summarizing emails from the collaboration tool during a selected time period; hide all messages from the collaboration tool from the user's inbox, instead generating a native application-level notification that displays an icon associated with the collaboration tool; reformatting at least a portion of the received email message into a specified file format (e.g., PDF, Microsoft Word, Adobe Photoshop, and so on) and causing the client application to download or otherwise received the reformatted file; accessing a third-party web service specified in the payload to obtain information or data (e.g., social media information, remote CSS, remote HTML, remote Javascript, and so on); marking the email message as "read" and permitting the message to be shown in the inbox; tagging or categorizing the message based on the payload; accessing a client-level service or sensor of the client device (e.g., global positioning sensor, touch input sensor, camera, accelerometer, and so on) and sending data from that client-level service to a specified location (e.g., web address or web-based API or back to the collaboration tool); sorting the email message into a particular folder or group of like messages based on the payload (e.g., messages with content requiring the user to read, such as a news article or a comment added to the collaboration tool sorted differently than messages with content soliciting action, such as a voting or survey request); and so on.

In many cases, the client application can be configured to perform multiple action items that can be performed in any suitable order defined by the payload. For example, a payload can cause the client application to render a native-application window including a survey question, defined at least in part by the payload. Once the user responds to the survey in the native-application window, a second window can be generated based on the payload that asks a second question or survey of the user. In these examples, it may be appreciated that any number of sequential actions can be performed by a client application such as described herein. Similarly, it may be appreciated that any number of suitable action items can be performed simultaneously.

These and other embodiments described herein architect a system in which a sender of an email message can define actions to be taken by a client device or an electronic mail client application receiving that message. In other cases, however, a payload such as described herein can be configured to operate with one or more user preferences and/or permissions defined by a preferences file stored on the client device and accessible to the electronic mail client application. In these examples, the client application may perform tasks or action items defined by a payload described herein only if such action items are permissible to be performed according to the user's preferences. For example, a user may have a preference that no message is hidden from that user's inbox. In these examples, the electronic mail client application may ignore any instruction or action item in a payload that would otherwise cause the electronic mail client application to hide the message.

It may be appreciated that the foregoing examples are not exhaustive. It may be appreciated that a payload, such as described herein, can be configured in any suitable way to trigger or otherwise cause any number of suitable tasks or operations to be performed by a client device, such as described herein. The payload can cause a client device to, without limitation: summarize certain email messages into a single email message delivered at a particular time of day (e.g., set by a user's preferences or by a payload or both); summarize certain email messages into a single notification that is displayed in a customized manner (e.g., with an icon defined by a payload, with emphasis or text formatting defined by the payload, with a size or shape or style defined by the payload and so on) and/or displayed to the user at a particular interval or at a particular time (e.g., set by a user's preferences or by a payload or both); aggressively notify a user that the email message has been received, by accessing one or more client-level notification devices, such as speakers, haptic elements, and/or other service; suppress all indications that a an email message has been received; preventing an email received from being stored; emphasizing or performing an action on another email message after receiving a first email message (e.g., a reminder message or follow-up message); generate a user interface ("UI") element according to a definition in the payload (e.g., button, slider, popup, text entry field, radio button, select button, and so on); associate an action to be performed by the client application in response to a user interaction with a particular UI element; schedule a task to be performed or an action item to be performed if the user does not perform an action within a particular time period; retrieve input from a sensor or other hardware component of the end-user device and send information retrieved therefrom to another component or system; and so on.

It may be appreciated that the foregoing examples are not exhaustive; a person of skill in the art may appreciated that any suitable number of action items, including any suitable action or set of actions can be performed by a system such as described herein. For simplicity of description, the embodiments that follow reference an example sender of an email as a notification service of a collaboration tool. The collaboration tool can leverage the notification service to insert/embed one or more actions into different email messages to an end user. The payload(s) embedded into said messages can inform one or more manners by which the end user consumes information in those messages.

For example, the collaboration tool may send email messages to a user: each time a project assigned to the end user is updated; each time another user comments on something owned, authored, or under the control of the end user; at an interval with statistics describing the function or operation of a project in a given time period (e.g., how many users accessed a site or page on a particular day, how many unit tests are passing or failing, how many team members pushed commits to a particular project in a particular time period, and so on); and the like. In these examples, the collaboration tool can be configured to inject or embed a payload that triggers different behavior on the end user's device depending upon the type or kind of message sent by the notification service. For example, informational notices sent to the end user (e.g., statistics, notifications, and so on) may be presented in a different manner than actionable notices (e.g., surveys, approval emails, meeting invitations, voting, and so on). For example, information notices that are high priority may be suppressed from the user's inbox but may trigger the electronic mail client application to generate a high priority notification (e.g., along with a sound, a haptic alert, and so on). In these cases, informational notices that are low priority may be suppressed from the user's inbox but may trigger the electronic mail client application to generate a summary notification or email message once per day (or at another interval such as weekly, hourly, and so on) that summarizes content from all messages of that type received in a time interval. Similarly, informational notices that have a medium priority may be suppressed from the user's inbox but may trigger the electronic mail client application to generate a low-priority notification (e.g., lock screen notification, silent notification, and the like) that the email.

In other examples, the collaboration tool can create a payload that triggers actions based, at least in part, on the end-user's location when that user receives an email message. In a simple phrasing, in some examples, the collaboration tool can instruct the client's device to locate itself (e.g., by leveraging a global positioning sensor, by accessing Wi-Fi connection information, and so on) and, based on the location, determine whether additional action items should be performed. In a simple example, this construction can enable different behaviors for notifications or other action items based on whether the user is at work, whether the user is at a job site, or whether the user is not within a recognized area. In this manner, a user's work-related notifications or emails may be processed differently depending upon where the user is when the message is received. In another example, the payload can further cause the user's electronic mail client application to generate an out of office message in response to receiving a message when the user's client device determines that the user is not within a recognized location.

Similar to location information obtained from a user's client device, other outputs from other sensors can be obtained to inform other behaviors of the electronic mail client application and/or the client device. Examples include but are not limited to: providing different notification types depending upon ambient sound levels (e.g., high ambient sound triggers haptic alerts, whereas low ambient sound triggers audio alerts); providing different user interface elements or different user interfaces based on whether the user is driving (e.g., a global positioning sensor reports high speed); providing different user interface elements, different alerts, or different notification schemes based on a time of day or night; increasing or decreasing a reminder priority based on the user's location (e.g., suppress a reminder for a user to visit a file room if a Bluetooth sensor of the user's device reports that the user is within the file room); and so on.

As noted above, the foregoing examples are not exhaustive. To the contrary it will be appreciated that a payload such as described herein can be configured to define or leverage a Turing-complete programming language to trigger or cause to be triggered any suitable action or execution of code by a user's client device or by a user's electronic mail client application. In this manner, the embodiments described herein reference a defined format or protocol that can be leveraged by a sender of an email message and a recipient of an email message to convey additional information and/or to perform additional actions. In this manner, in a more simple and non-limiting phrasing, the embodiments described herein leverage popular and existing email communications protocols to confer additional functionality to a user that may provide the user with a more pleasant, a more organized, and a more useful email consumption experience.

An example of a collaboration tool, as described herein, is a project management system or tool that can be implemented in whole or in part as software executed by a virtual or physical server or other computing appliance or combination of appliances that provides a team of individuals with a method for communicating and exchanging information with one another. An example of a collaboration tool is a message board, a forum, a wiki, a project management system, an issue tracking system, and the like.

In some examples, a collaboration tool is configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs").

In other cases, a collaboration tool can be configured for non-software related purposes, such as for use by a human resources team, an information technology support group, and so on. It may be appreciated that a collaboration tool, such as described herein can be used to exchange files, text content, or information, facilitate text, audio, or video communication, or any other suitable collaboration or communication purpose. In this manner, a collaboration tool increases efficiency of a team of individuals working on a common goal or project by increasing the speed by which information can be shared between team members, between supervisors and subordinates, and between management and staff.

In addition, in many conventional implementations, a collaboration tool can include a notification system and/or notification server configured to generate and deliver notifications, such email notifications directed to one or more users of the tool. In one example, an email can be sent to a user when particular content tracked, stored, or otherwise available to (or conveyed by) the collaboration tool is added, changed, or removed.

In other cases, emails can be provided for other purposes. Examples include, but are not limited to: an email to a first user that a second user of the same collaboration tool has mentioned the first user in a post, comment, or other content tracked or consumed by the collaboration tool or a system connected thereto; an email to a user that content tagged by that user has been changed or updated; an email to a user that content added by that user has been changed or updated; an email to a user that content created by that user has received a comment from another user; an email to a user that a project belonging to that user has changed (e.g., a new task has been assigned to the user or another user, a new story has been added, a new epic has been added, and so on); and so on. It may be appreciated that the foregoing examples are not exhaustive; an email such as described herein can be sent by a collaboration tool for any suitable purpose.

As noted above, an email sent by a collaboration tool such as described herein can include and/or can be accompanied by any number of suitable data items and/or content, including an embedded payload such as described herein. For example, an email can include without limitation: a title; a send date; a received date; a display date; a read date; text, video, image, and/or audio content; tags; one or more user identifiers (e.g., a username, a user alias, a user name, and so on); a profile photo, icon, emoji, picture, or avatar; an attachment; an anchor link to other content stored by the collaboration tool (e.g., a content server), another service, or a third party; and so on.

These foregoing and other embodiments are discussed below with reference to FIGS. 1-5. However, those skilled in the art will readily appreciate that the detailed description given herein with respect to these figures is for explanatory purposes only and should not be construed as limiting.

Figure 1:
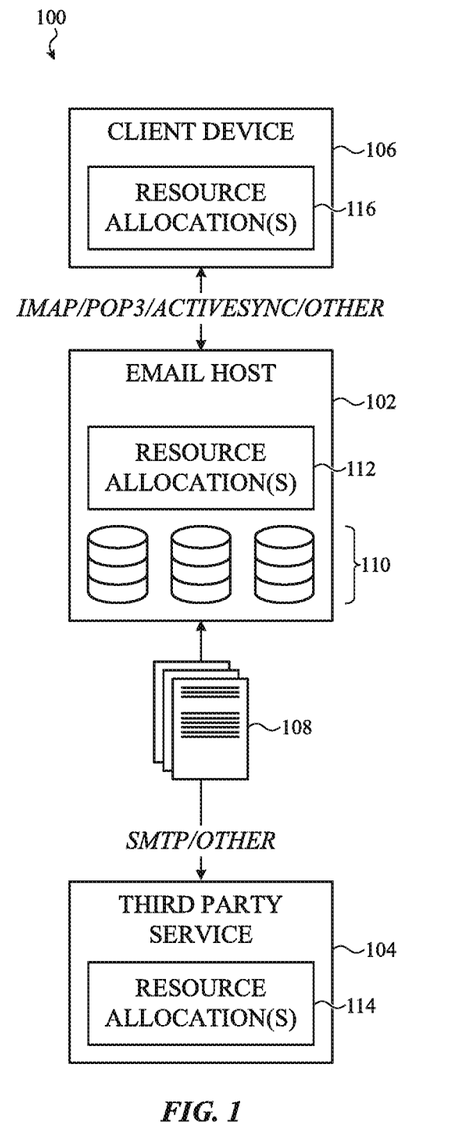
FIG. 1 depicts a system configured to send and receive email messages, that can include a payload such as described herein.

FIG. 1 depicts a system configured to send and receive email messages, that can include a payload such as described herein. In this example embodiment, the system 100 includes an email host server 102 which, in turn, is coupled to both a third-party server 104 and a client device 106. More specifically, in many implementations, the email host server 102 is communicably coupled to the third party server 104 via one or more email message sending communication protocols, such as the Simple Mail Transfer Protocol ("SMTP"). Similarly, the email host server 102 is communicably coupled to the client device 106 via one or more email message receipt communication protocols, such as the Internet Message Access Protocol ("IMAP"), the Post Office Protocol (e.g., "POP3"), or other protocols, such as Microsoft's Exchange/ActiveSync protocol.

As a result of this architecture, the third-party server 104 can generate an email message 108 that includes a payload, such as described herein, and can communicate the email message 108 to the email host server 102 which may store the email message 108 in a database, such as one of the databases 110. Thereafter, the client device 106 can submit a request to the email host server 102 to receive a copy of the email message 108, served from one of the databases 110 of the email host server 102. Thereafter, the client device 106 can parse the email message to extract a payload, such as described herein.

It is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each server or service of the system 100 of FIG. 1 can be implemented in a number of suitable ways. As illustrated, the email host server 102, the third-party server 104, and the client device 106 each includes one or more purpose-configured components, which may be either software or hardware. In particular, it may be appreciated that although these functional elements are identified as separate and distinct devices (e.g., servers) that can each include allocations of physical or virtual resources (identified in the figure as the resource allocations 112, 114, and 116 respectively), such as one or more processors, memory, and/or communication modules (e.g., network connections and the like), that such an implementation is not required. More generally, it may be appreciated that the various functions described herein of a host server 102 can be performed by any suitable physical hardware, virtual machine, containerized machine, or any combination thereof.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Generally and broadly, FIGS. 2A-2D depict system diagrams related to systems, such as those described herein, that send and receive email messages including a payload such as described herein.

Figure 2A:
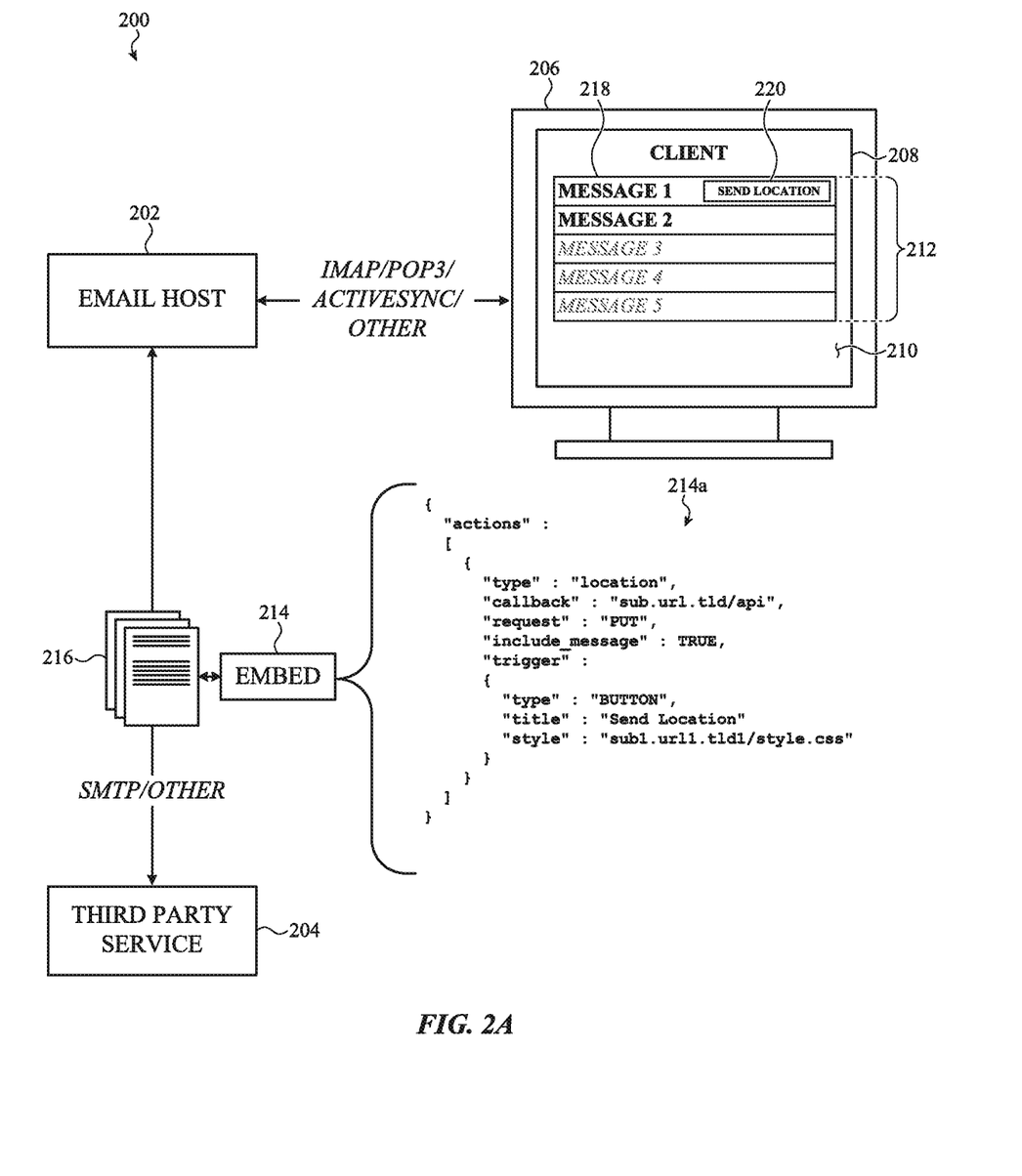
FIG. 2A depicts another system configured to send and receive payload-embedded email messages, such as described herein.

FIG. 2A depicts another system configured to send and receive payload-embedded email messages, such as described herein. In this example embodiment, the system 200 includes an email host 202 that is communicably coupled to a third party server or service, identified as the third party service 204. As with other embodiments described herein, the third party service 204 is configured to generate an email message including a payload, such as described herein.

Once an email message from the third party service 204 is received by the email host 202, a client device 206 can be notified by the email host 202 that the message is available for download.

More specifically, as with other embodiments described herein, the client device 206 can include a processor (not shown) and a memory (not shown). The processor of the client device 206 can access the memory to retrieve computer code or instructions, that when executed by the processor cause the processor to operate with the memory (or another memory) to instantiate an instance of an electronic mail client application, such as described herein, that is configured to generate leverage a display 208 of the client device 206 to render a graphical user interface 210 to display one or more email messages in a message list 212 that are received by the electronic mail client application from the email host 202.

In this embodiment, as with others described herein, messages generated by the third party service 204 can include a payload, illustrated in figure as the embedded payload 214 inserted into the email message 216.

In this example, the embedded payload 214 includes a string value 214a encoding structured data in a JSON format. The embedded payload 214 includes a number of attributes, lists, and objects that each define a portion of an action item to be performed by the client device 206 when the client device 206 receives the email message 216. In this example, the embedded payload 214 includes instructions such that when the message is displayed as a row 218 in the message list 212, the row 218 can be rendered with an additional UI element 220 that, when clicked by a user, sends the user's location to a specified server via an HTTP PUT request. More specifically, in response to the embedded payload 214, the client device 206 can query a global positioning sensor of the client device 206 (or another location proxy, such as a Bluetooth beacon, a cellular radio address, or a Wi-Fi network address or B/SSID) and receive results of that query as input to provide to the address specified in the embedded payload 214.

Figure 2B:
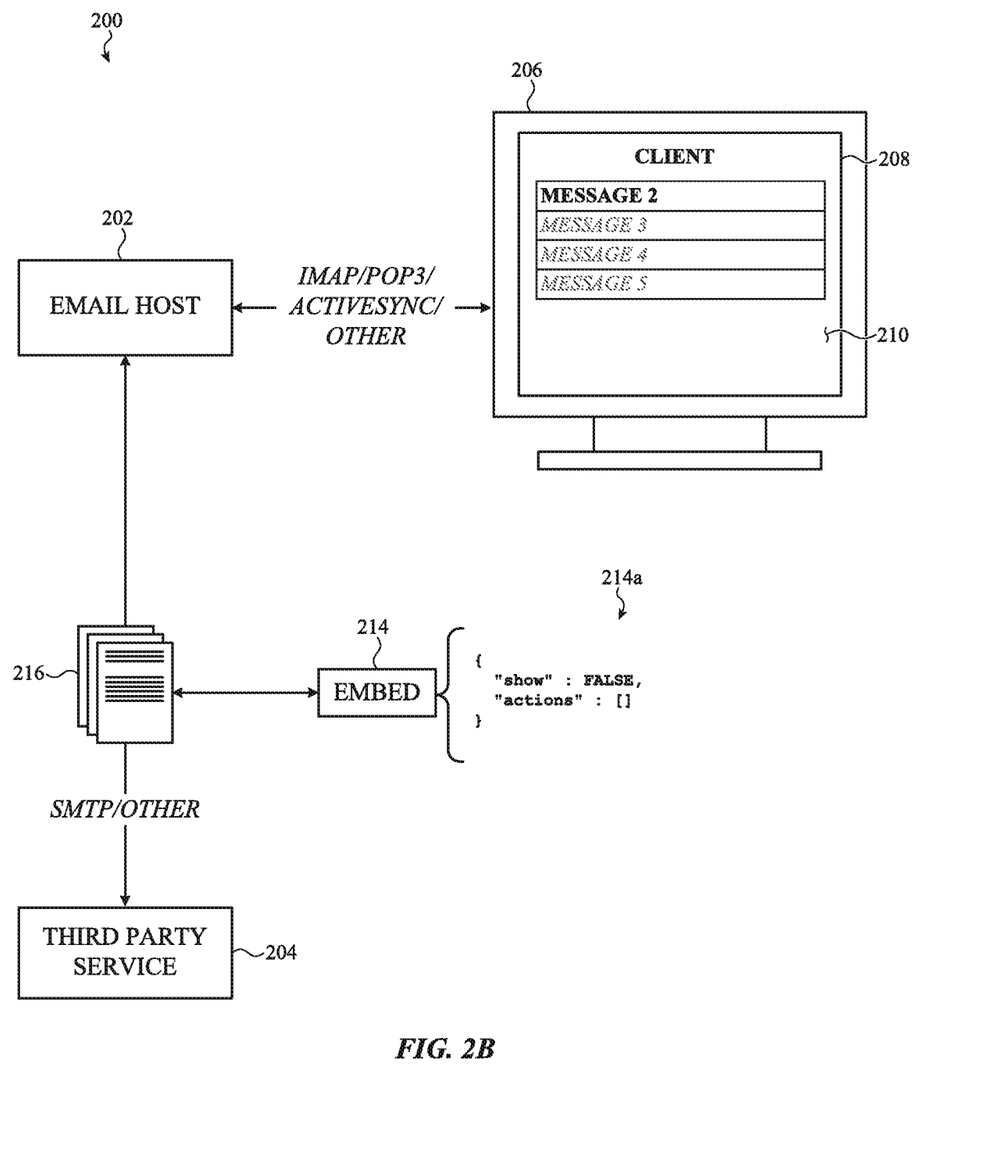
FIG. 2B depicts another system configured to send and receive payload-embedded email messages, such as described herein.

This example embodiment is not exhaustive of the various tasks, operations, formats, or UI element modifications that can be performed when a payload such as the embedded payload 214 is received. For example, FIG. 2B depicts another system configured to send and receive payload-embedded email messages, such as described herein. The system in this embodiment can be configured in the same manner as the system 200 described in reference to FIG. 2A; this description is not repeated. In this embodiment, the embedded payload 214 defines for the client device 206 that display of the message 216 should be suppressed. Namely, the embedded payload 214 comprises an instruction to the electronic mail client application to suppress rendering of the email message 216 such that the display 208, rendering the graphical user interface 218, does not display any information related to the email message 216.

Figure 2C:
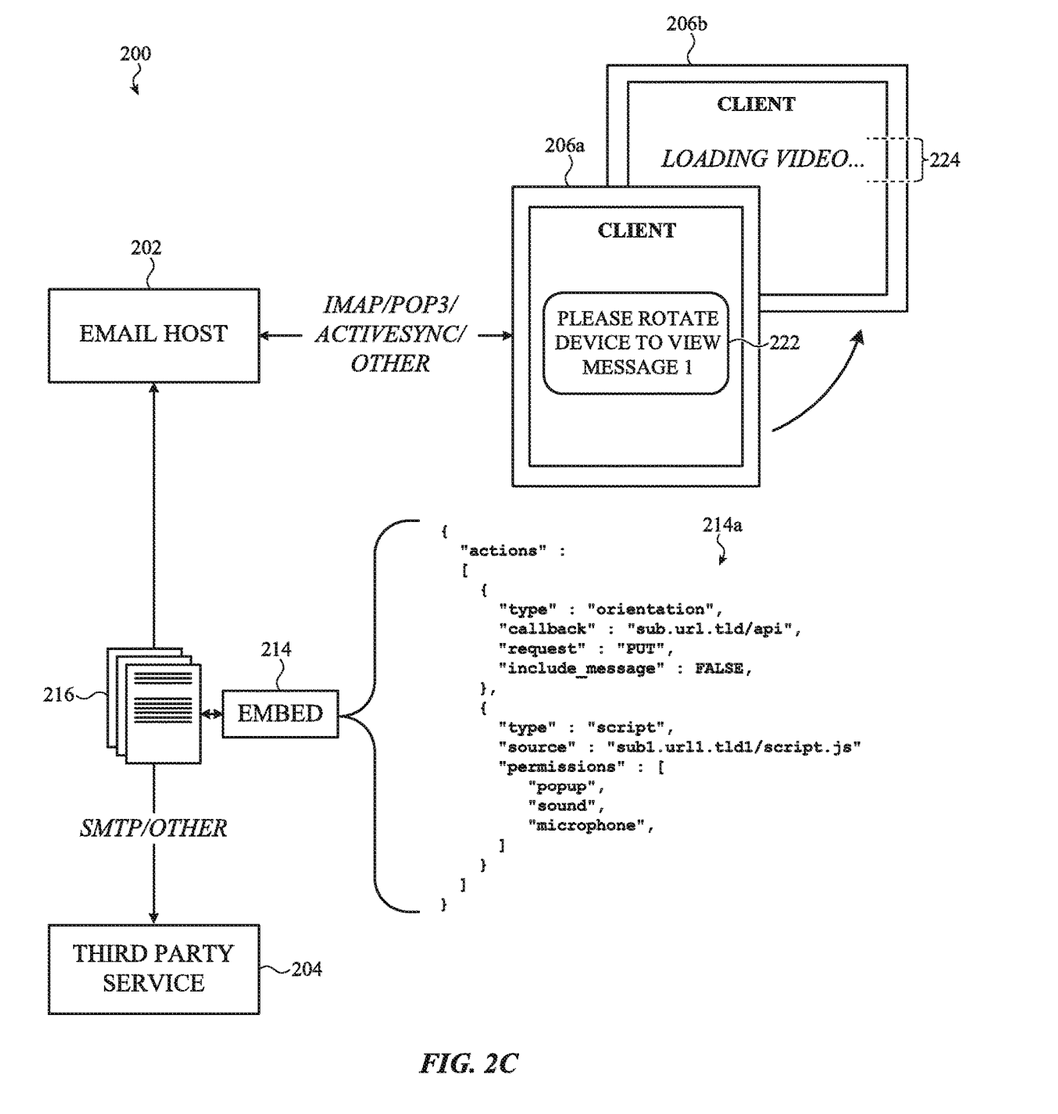
FIG. 2C depicts another system configured to send and receive payload-embedded email messages, such as described herein.

Depicting yet another example, FIG. 2C depicts a system configured to send and receive payload-embedded email messages, such as described herein. In this example, multiple actions can be performed by the client device 206 or, more specifically, the electronic mail client application executed by the processor of the client device 206. In this example, the embedded payload 214 can instruct the client device 206 to render a first user interface 206a in response to a determination (e.g., a query to a sensor of the client device 206, such as a gyroscope) that an orientation of the client device 208 is not landscape. The first user interface 206a can include a notification 222 to suggest to the user to rotate the client device. 208. Alternatively, once the client device 208 is rotated landscape, a second user interface 206 can be rendered which shows alternative content 224.

Figure 2D:
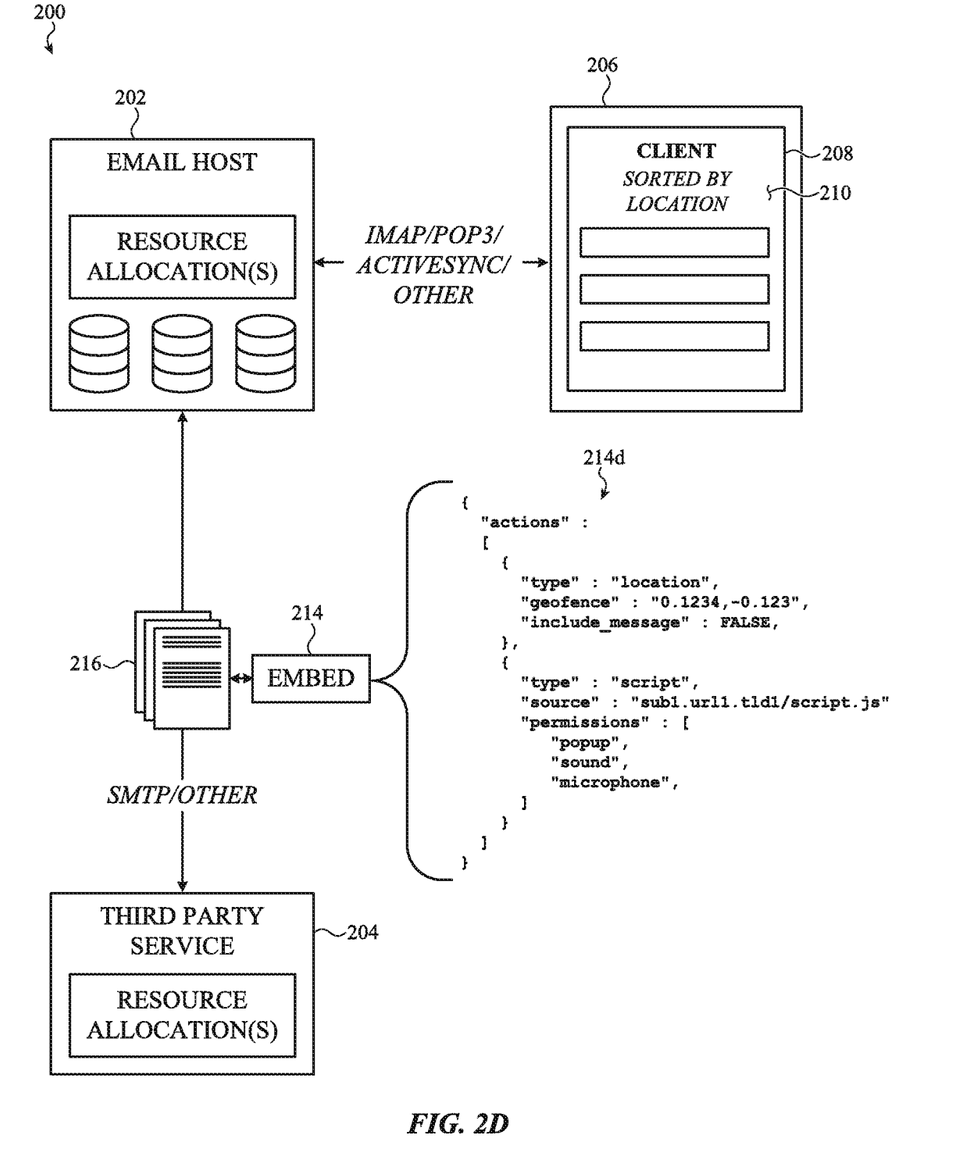
FIG. 2D depicts another system configured to send and receive payload-embedded email messages, such as described herein.

In yet a further example, FIG. 2D depicts a system configured to send and receive payload-embedded email messages such as described herein. In this example, a location-based sorting action can be performed by the client device 206 or, more specifically, the electronic mail client application executed by the processor of the client device 206. In this example, the embedded payload 214 can instruct the client device 206 to render a user interface 210 in response to a determination of location using at least one location sensor within the client device 206. Example location sensors include global positioning sensors, Bluetooth communication components, Wi-Fi communication components, position sensors such as inertial measurement units, gyroscopes, and accelerometers. With said location information, the client device 206 can order messages based on the location information. As a result of this configuration, the client device 206 can display work-relevant messages only when the end user is physically at a work location and, similarly, can only display personal messages only when the end user is physically at home or, alternatively, not at a work location. In further examples, sorting may be more granular. For example, different messages relevant to different physical locations at a worksite may be shown when the user is physically present at those locations. For example, messages related to a particular meeting can be sorted to the top of a messages list when the user is physically present within a conference room. In another example, messages related to a particular product line can be shown when the user is within the assembly room for that product.

The foregoing examples are not exhaustive; other examples and other means of sorting messages and/or notifying a user of a new message (or an old message) can be used in accordance with the embodiments described herein.

The foregoing example embodiments are not exhaustive of the various actions or tasks that can be performed by a system, such as described herein. As noted above, user interface element actions are merely examples. In other cases, user interface modifications may not be required or instructed by a payload, such as described herein. More specifically, in some examples, only background actions or action items may be performed.

Figure 3:
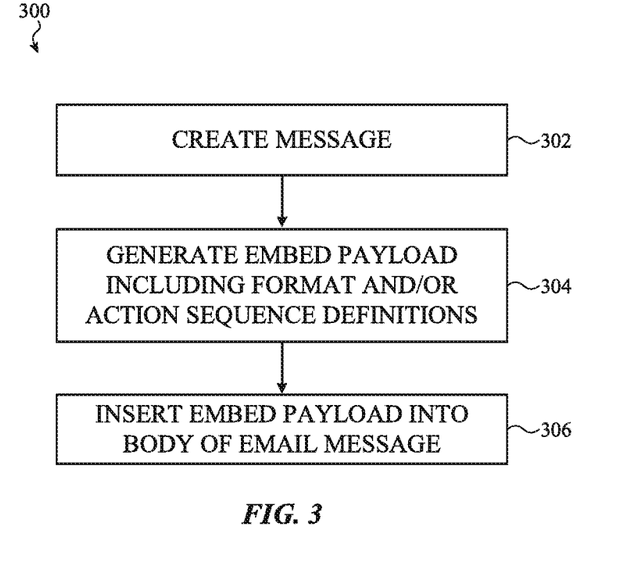
FIG. 3 is a flowchart depicting example operations of a third-party server performing a method of generating a payload-embedded email message, such as described herein.

FIG. 3 is a flowchart depicting example operations of a third-party server performing a method of generating a payload-embedded email message, such as described herein. As with other embodiments described herein, the method 300 can be performed by any suitable hardware or software, or combination thereof. In many cases, the method 300 is performed, at least in part, by a processor of a third-party server in response to an automated task executed by a collaboration tool, such as described herein. In other cases, the method 300 is performed in whole or in part, by an email drafting application operated by a real person operator.

The method 300 includes operation 302 at which an email message draft is created. Next, at operation 304, an embedded payload (referred to in the figure as an "embed payload") is generated, which as noted above can include or otherwise be expressed as a string representation of structured and computer-readable data. The payload can include one or more formatting instructions, action items, behavior settings, and so on. The payload can be encrypted or can be unencrypted. In many examples, the payload is JSON-formatted, but this is not required.

The method 300 includes operation 306 at which the payload can be inserted as a string into a body portion of the email message drafted/created at operation 302. The payload string can be inserted at any suitable portion of the email message. In other cases, the payload can be inserted into as a message header. In other cases, the payload can be inserted into in a CSS file associated with or linked in the email message. In still further examples, the payload can be saved in a database and a URL to the payload can be inserted into the email body. These foregoing examples are not exhaustive, as noted above, a payload such as described herein can be inserted into any suitable portion, as a whole or broken into parts, in any suitable encrypted or unencrypted manner.

As noted above, a method such as the method 300 can be leveraged and/or performed in whole or in part to affect any suitable function or operation of an electronic device—or combinations thereof arranged in a workflow or a set of parallel or series workflows—to provide one or more additional benefits or features to a recipient of an email message and/or to a sender of said email messages. Examples include, but are not limited to actions leveraging: graphical user interface components; notification components; hardware components local to an end-user electronic device; hardware components in communication with an end-user electronic device including industrial control appliances and home automation appliances; and so on. Any of these example functions or apparatuses can be used to confer one or more additional features to a recipient or sender of an email message without requiring that either the sender or recipient adopt a specialized messaging or chat application to exchange messages.

Figure 4:
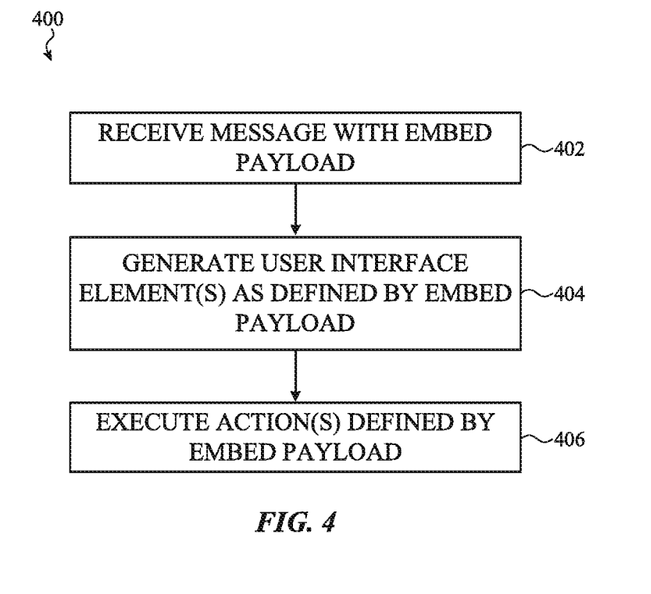
FIG. 4 is a flowchart depicting example operations of an electronic mail client application performing a method of processing a payload-embedded email message, such as described herein.

FIG. 4 is a flowchart depicting example operations of an electronic mail client application performing a method of processing a payload-embedded email message, such as described herein. As with other embodiments described herein, the method 400 can be performed by any suitable hardware or software, or combination thereof. In many cases, the method 400 is performed, at least in part, by a processor of a client device, executing an electronic mail client application.

The method 400 includes operation 402 at which a message with an embed payload is received by the electronic mail client application. As with other examples described herein, the electronic mail client application can extract the payload from the email message in any suitable and/or implementation-specific manner. In many cases, the electronic mail client application is configured to extract the payload as a string and, thereafter, generate a data object from the string.

Next, at operation 404 the method 400 advances to generate one or more user interface elements that are defined by the payload or, more specifically, the string value or data object derived from the received email message.

Next, at operation 406 the method 400 advances to perform (or schedule to be performed) on or more action items defined by the payload. As noted above, the action items can be performed in series or in parallel and may be any suitable action or set of actions. Examples include, but are not limited to: generating a notification; generating a sound; generating a haptic feedback; generating a request to a third-party server; receiving a response from the third-party server; querying a database; receiving a result from a query to a database; determining a state of a sensor; obtaining input from a sensor; generate a user interface element; generate a user interface element; hide a user interface element; change formatting of a user interface element; emphasize a particular email message or set of messages; hide a particular message or set of messages; log a user into a system or service; log a user out of a system or service; access a third-party image hosting website; connect to or disconnect from a particular network; perform a home or office automation task; and so on and the like.

Figure 5:
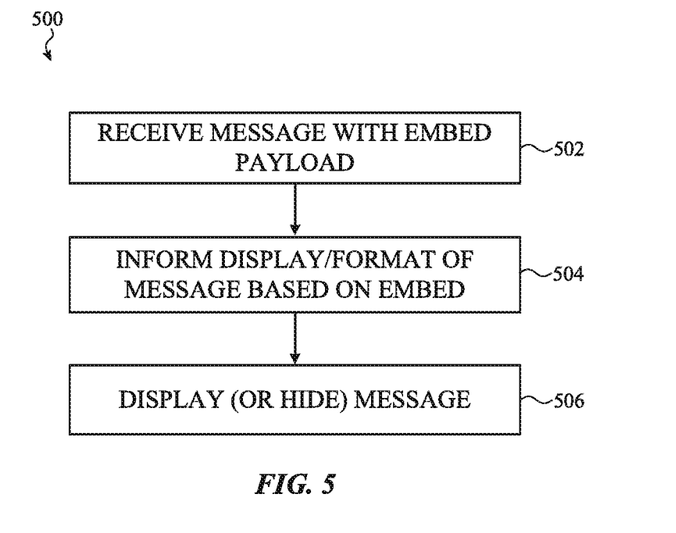
FIG. 5 is a flowchart depicting example operations of an electronic mail client application performing a method of processing a payload-embedded email message, such as described herein.

FIG. 5 is a flowchart depicting example operations of an electronic mail client application performing a method of processing a payload-embedded email message, such as described herein. The method 500, similar to method 400 can be performed by any suitable combination of hardware or software but, in many embodiments, the method 500 is performed in whole or in part by an electronic mail client application that can be executed by a client device, such as described above. Example client devices include, but are not limited to: cellular phones; tablet computers; desktop computers; and the like.

The method 500 includes operation 502 at which an email message with an embed payload is received. Next, at operation 504, one or more content items and/or format characteristics of the message. In other words, at operation 504, the method 500 can extract one or more portions of the payload to inform the display and/or format of the message received at operation 502. Example format characteristics include, but are not limited to: font color; font size; border color; border size; font name; background color; format tags; format classes; and so on.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic mail client device configured to communicably couple to an electronic mail host server, the electronic mail client device comprising:
   a display configured to render a graphical user interface;
   a location sensor;
   a memory storing computer program instructions; and
   a processor configured access the memory and to execute the computer program instructions to instantiate an electronic mail client application, the electronic mail client application configured to perform operations of:
      generating and submitting a request to the electronic mail host server;
      receiving from the electronic mail host server, in response to the request, a message file comprising a custom embed tag;
      extracting from the message file, string content enclosed by the custom embed tag;
      instantiating a data object based on the string content; and
      in accordance with a determination that the data object comprises a first instruction to the electronic mail client application obtain a location of the electronic mail client device:
         obtaining a location of the electronic mail client device using the location sensor;
         modifying a display order of messages displayed by the electronic mail client application based on the location; and
         displaying at least a portion of content of the message file in a notification generated by the electronic mail client application, the notification based at least in part on the location.

2. The electronic mail client device of claim 1, wherein the electronic mail client application is configured to extract an action item list from the data object.

3. The electronic mail client device of claim 2, wherein, to perform each respective action item of the action item list, the electronic mail client application is configured to:
   render, in the graphical user interface, a user interface element only upon determining that the respective action item comprises a user interface element definition, the user interface element rendered according to the user interface element definition; and
   define an action to be taken by the processor in response to a specified user interaction with the user interface element, the action and the specified user interaction defined by the respective action item.

4. The electronic mail client device of claim 3, wherein the action to be taken by the processor for at least one respective action item of the action item list comprises one of:
   querying a state of a sensor of the electronic mail client device;
   submitting a request to a third-party server;
   soliciting input from a user of the electronic mail client device; or
   querying a database stored in the memory of the electronic mail client device.

5. The electronic mail client device of claim 3, wherein the electronic mail client application is configured to perform each action item of the action item list in an order defined by the data object.

6. The electronic mail client device of claim 1, wherein the electronic mail client application is configured to render in the graphical user interface only a specified portion of the message file in a specified display area of the graphical user interface only upon determining that the data object comprises an instruction to the electronic mail client application to display the message file.

7. The electronic mail client device of claim 6, wherein the specified portion and the specified display area are defined by the data object.

8. The electronic mail client device of claim 1, wherein the electronic mail client application is configured to display a notification in the graphical user interface upon determining that the data object comprises a command to generate the a message notification.

9. The electronic mail client device of claim 8, wherein the notification is defined, at least in part, by the data object.

10. The electronic mail client device of claim 9, wherein the notification comprises an audio output generated by a speaker of the electronic mail client device, the audio output defined at least in part by the data object.

11. The electronic mail client device of claim 9, wherein the notification comprises a haptic output generated by a haptic output element of the electronic mail client device, the haptic output defined at least in part by the data object.

12. The electronic mail client device of claim 1, wherein the electronic mail client application is configured to store the message file in the memory only upon determining that the data object comprises an authorization to store of the message file.

13. The electronic mail client device of claim 12, wherein the authorization comprises an authorization token.

14. The electronic mail client device of claim 1, wherein the sensor comprises one of:
   a global positioning system sensor; or
   a Bluetooth sensor.

* * * * *